UNITED STATES PATENT OFFICE.

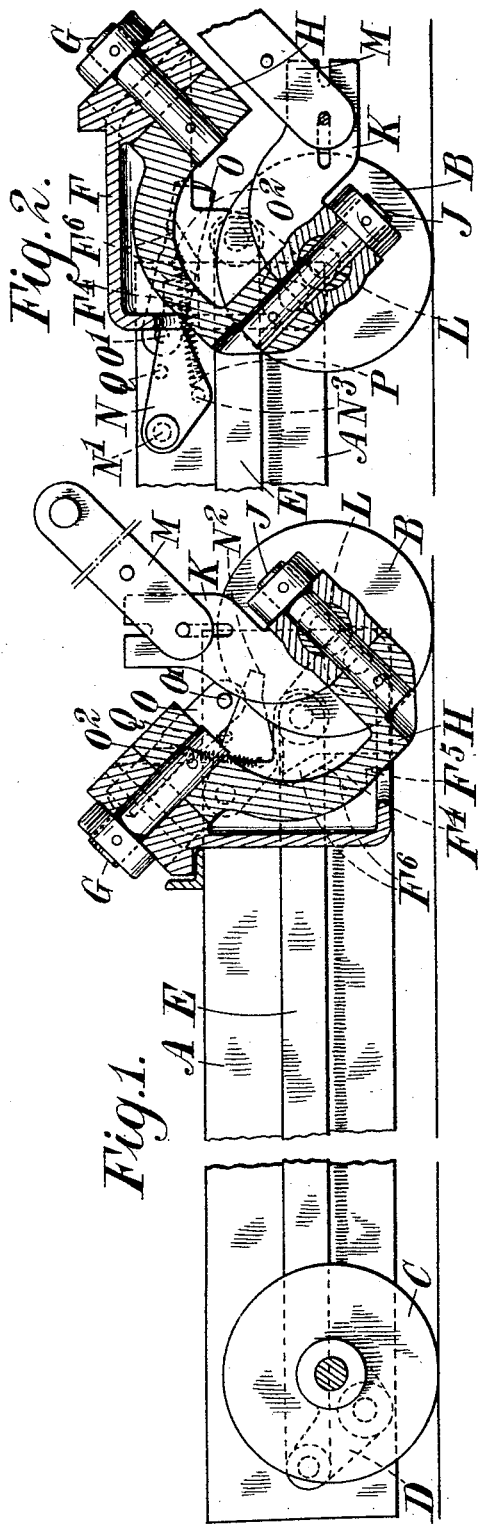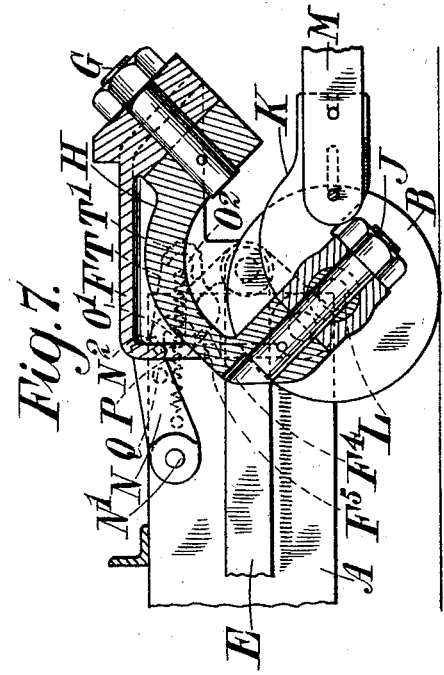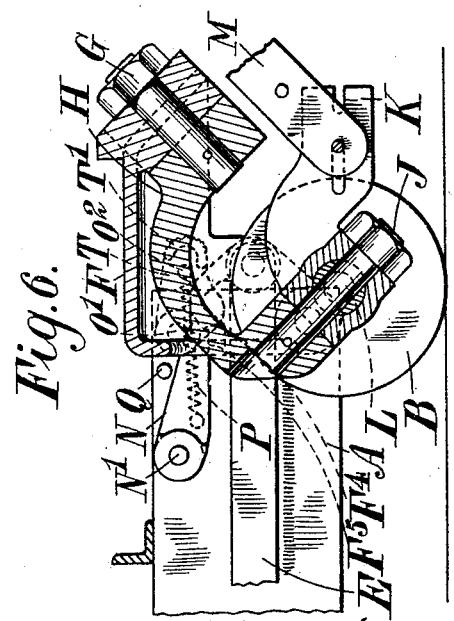

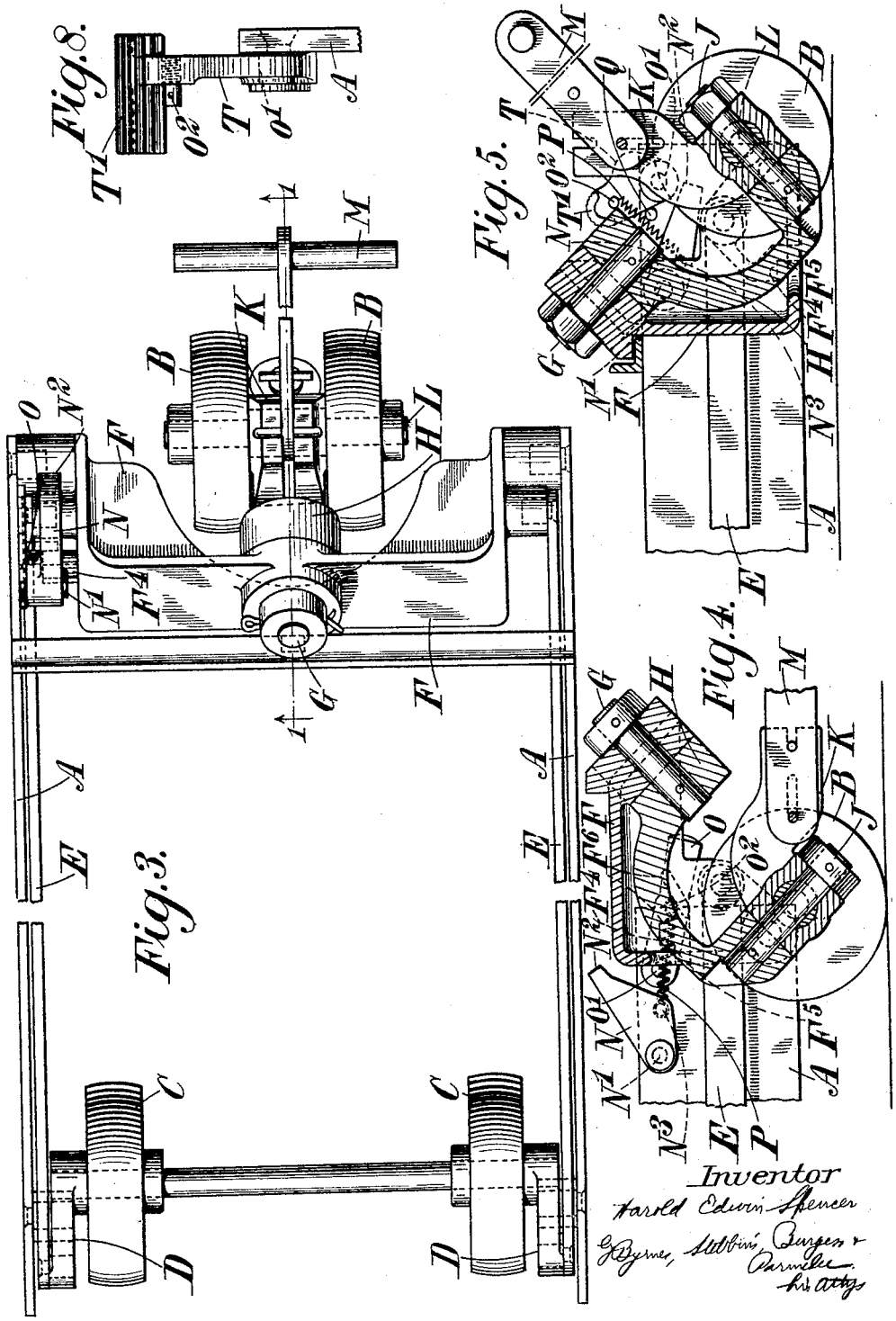

HAROLD EDWIN SPENCER, OF GRAVESEND, ENGLAND, ASSIGNOR TO HESCO LIMITED, OF LONDON, ENGLAND.

LIFTING TRUCK.

1,403,651.  Specification of Letters Patent.  Patented Jan. 17, 1922.

Application filed April 12, 1920. Serial No. 373,356.

*To all whom it may concern:*

Be it known that I, HAROLD EDWIN SPENCER, subject of the King of England, residing at Gravesend, in the county of Kent, England, have invented certain new and useful Improvements in Lifting Trucks, of which the following is a specification.

This invention is for improvements in or relating to lifting-trucks; that is to say to trucks whereof one part can be raised and lowered relatively to another part in order to permit the truck to be run under a load, the movable part of the truck raised to lift the load clear of the ground and the load then transported on the truck in such raised position. Subsequently by lowering the movable part of the truck the load can be deposited on the ground again and the truck drawn out from under it.

The invention relates to lifting-trucks of the type in which a pawl operating between two parts, one of which moves relatively to the other during the raising and lowering of the truck, is employed to retain the movable part in its position corresponding to the raised position of the truck, when desired.

In certain lifting-trucks of this type as hereinbefore constructed a spring is provided which automatically releases the pawl when the draught handle of the truck is actuated to take the weight of the load off the pawl, this spring always tending to pull the pawl out of operative position when the truck is in its raised position. This constant tendency to render the pawl inoperative is objectionable from some points of view, particularly when the various parts of the mechanism become somewhat worn or out of correct adjustment, as abnormal jolting of the truck due to passage over rough ground is liable, for example, to cause the pawl to be withdrawn into inoperative position. This, of course, is highly undesirable.

The present invention has for one of its objects to provide an improved construction of lifting-truck of the type set forth above in which the pawl is not, while in operative position, necessarily subject to a force tending to withdraw it from such position. That is to say the withdrawal tendency can be initiated at the will of the operator.

Other objects of the invention are to provide a more effective and reliable locking mechanism for lifting-trucks than has heretofore been available, and to provide a construction which shall be simple in design and easy to manufacture.

The primary feature of the present invention consists in a lifting-truck of the type above described which is characterized in that the pawl is provided with a controlling and withdrawal device (for example a lever) operatively connected through yielding means (for example a spring) to the pawl, and in that abutments are provided on the truck to limit the movement of the said controlling and withdrawal device in two positions (for example two angular positions of a lever about its pivot) in one only of which the relative positions of the controlling device and pawl are such that the controlling device, through the yielding means connecting it to the pawl, applies withdrawal force to the latter to tend to withdraw it from operative position, the normal mode of bringing said controlling device into pawl-withdrawing position being manual and independent of the lifting-mechanism of the truck, and the normal position occupied by said controlling device during travel of the truck both in its lowered and raised positions being that in which the controlling device is not applying withdrawal force to the pawl.

This and other features of the invention will be fully described and indicated in the following specification and its appended claims.

There will now be described, by way of example only, certain constructional forms of lifting-truck according to the invention. It is to be understood that the invention is not limited to the precise details of construction enumerated.

In the drawings—

Figure 1 is a side elevation partly in section of a lifting-truck, the parts thereof with which the present invention is more particularly concerned being shown in full or dotted lines, while the remainder of the truck is shown in chain lines. In this figure the truck is shown with its frame lowered.

Figure 2 is a corresponding partial view with the parts in the position they occupy when the frame is raised, and when the controlling and withdrawal lever has been set into pawl-withdrawing position.

Figure 3 is a plan corresponding to Figure 1.

Figure 4 is a view somewhat similar to Figure 2, but showing the parts in the position they occupy near the commencement of the operation of lowering the frame.

Figure 5 is a view corresponding to a portion of Figure 1 showing a modified construction of truck.

Figure 6 is a view corresponding to Figure 2 of the construction shown in Figure 5.

Figure 7 is a view corresponding to Figure 4 of the construction shown in Figure 5, and Figure 8 is a detail view on a larger scale.

Like letters of reference indicate like parts throughout the drawings.

Referring firstly to Figures 1 to 4, the lifting-truck illustrated is of the kind described in my United States specification No. 373,355 and comprises a frame A mounted upon two pairs of wheels B and C by bell-crank levers D and a cross-member F connected to the levers D by bars E. One end of each bell-crank lever is mounted on the axle of the wheels C, and intermediate its ends each bell-crank lever is mounted on the frame A. The cross-member F is pivoted in the frame A at each side. Pivoted in the cross-member F on a pivot G is an element H, carrying another pivot J on which is mounted a steering head K. The wheels B are the steering wheels of the truck, and the steering head K moves with the axle L of these steering wheels. The draught handle M by means of a pin and slot connection with the steering head K may be coupled to the cross-member F to rotate the same about the axle L to raise or lower the frame A, all as described in my aforesaid specification No. 373,355.

When the cross-member F and its connected parts have been brought into the raised position of the frame, see Figure 2, it is necessary to provide means for preventing undesired rotation of the parts due to gravity. For this purpose a pawl N is provided. This pawl is pivoted at $N^1$ upon the frame A and its end $N^2$ is arranged in the path of a projection $F^4$ on the cross-member F. Adjacent the projection $F^4$ is a ledge $F^5$ upon which the end of the pawl may rest while in engagement with the projection $F^4$. Also pivoted on the frame A is a controlling and withdrawal lever O, its pivot being designated $O^1$. This lever O is connected to the pawl N by studs $O^2$ and $N^3$ respectively being coupled by yielding means which in the construction illustrated take the form of a spring P, and the lever is arranged to bear against a stop pin Q on the frame A when the parts are in the position shown in Figure 1. Adjacent the projection $F^4$ the cross-member F is provided with a cam $F^6$ against which, when the parts are in the position shown in Figure 2, the stud $O^2$ will bear.

The operation may be described as follows:—When the parts are in the position shown in Figure 1, the spring P is of such length as to sustain the pawl N in a position with its end $N^2$ slightly lower than that it occupies when in operative position resting on the ledge $F^5$ and engaging the projection $F^4$. As the cross-member F is rotated about the axle L to bring it into the position shown in Figure 2, namely with the frame raised, the projection $F^4$ will pass under the pawl N and allow the latter to fall by gravity behind it into operative position. The pawl N in this position will prevent undesired rotation of the cross-member F due to gravity, and it will be seen that in this position the pawl is not under the influence of any force tending to withdraw it from operative position. If desired the end $N^2$ may be shaped to correspond to a slight undercutting of the projection $F^4$ to provide a certain amount of resistance to withdrawal.

It will be seen from Figures 1 and 2 that the controlling and withdrawal lever O has two operative angular positions. Its function in one of these, namely that shown in Figure 1, has just been described, it merely sustaining the pawl N in position to fall into locking engagement with the projection $F^4$ as the latter is rotated under it. Its other position, namely that shown in Figure 2, is its pawl-withdrawing position. The lever O is moved into this position manually when it is desired to release the pawl prior to lowering the frame A. Referring to Figure 2 it will be seen that when the lever is in its pawl-withdrawing position, with its stud $O^2$ bearing against the cam surface $F^6$, the spring P is deformed, viz. stretched in the arrangement illustrated, and in addition to tending to withdraw the pawl N will operate to retain the lever O in this position. This occurs owing to the relative positions of the pivot $N^1$ and $O^1$ and of the studs $N^3$ and $O^2$. The lever therefore when once it has been placed in pawl-withdrawing position will remain there, even after withdrawing the pawl, until automatically returned to its other position as will be hereinafter described.

To effect the lowering of the frame A after the lever O has been brought into its pawl-withdrawing position it is next necessary to rotate the cross-member F in the frame-raising direction beyond the point at which the pawl N co-operates with it to prevent undesired rotation due to gravity. This extra rotation of the cross-member F is effected by the draught handle, and has the result first of taking the weight of the load off the pawl and releasing the end N² of the pawl from the projection F⁴, thus permitting the spring P to swing the pawl into the position shown in Figure 4. The weight of the frame and anything that may be on it is now entirely sustained by the draught handle and the latter may be rotated to lower the frame. In this frame-lowering rotation of the draught handle, and of the cross-member F, the cam surface F⁶ on the latter will lift the stud O² on the lever O into such a position that the spring P instead of, as heretofore, tending to retain the lever O in the position shown in Figure 2, will now operate to draw the lever back into the position shown in Figure 1. The lever O is therefore returned to the position shown in Figure 1 quite automatically consequent upon the rotation of the cross-member F. As the lever O reaches the position shown in Figure 1, the pawl N will also fall into the position shown in that figure and thus be in place ready to engage the projection F⁴ when next the cross-member F is rotated to raise the frame A.

Instead of the controlling and withdrawal-device taking the form of a hand-operated lever as in Figures 1 to 4, the lever may be formed suitably for foot operation. A construction embodying this principle is illustrated in Figures 5 to 8. This modified construction of truck also provides that when the controlling and withdrawal-device is in its pawl-withdrawing position it may project into the path of a movable part of the truck, other than the pivoted cross-member F as described in connection with Figures 1 to 4, so that in the frame-lowering movement it will automatically be moved from its pawl-withdrawing position towards its other position.

The foot lever T is pivoted at O¹ to the frame A and is provided with a pin or stud O² to which one end of the spring P is connected, similarly to the hand lever O in Figures 1 to 4. The lever T has an extended crown T¹ which may conveniently be serrated to afford a foothold. The operation of the lever T is similar to that of the lever O and need not be described in detail.

In Figures 1 to 4 the stud O² on the lever O bears against a cam surface on the cross-member F whereby the pawl-withdrawing position of the lever O is determined and whereby the latter is automatically moved during the frame-lowering operation towards its other position. Instead of this arrangement, however, in Figures 5 to 8 the crown T¹ is shown as being arranged to bear against the cross-member F when the lever is in its pawl-withdrawing position, and the automatic return of the lever towards its other position may be commenced by the cross-member F moving the lever through its crown and be continued by the coupling bar E coming into contact with the crown T¹ during the frame-lowering operation. Or instead of the pawl-withdrawing position of the lever being determined by contact between it and the cross-member, this position may be determined by contact between a projection, such as the crown T¹, on the lever and the coupling bar E. The desired operation may also be secured in other ways by employing other parts of the truck to form the required abutment and to give the required return movement. The controlling and withdrawal device might also be so arranged that its own weight assists its return.

It will be seen from the foregoing description that the pawl N is cleared when the truck is being raised so that it may fall into locking position at the right moment; in such locking position it is free from stress tending to release it, and the force necessary to release it need only be applied when release is required. Further, that the release will only occur when the weight of the load is taken off the locking mechanism, as although the controlling and withdrawal-device may be in pawl-withdrawing position, the pawl will not be withdrawn until the load has been thus removed from the locking mechanism. When this is done, however, not only may the truck be lowered, but the locking mechanism is automatically returned to the position in which it is ready to operate afresh.

It will be appreciated that the locking mechanism according to the present invention may be applied to constructions of lifting-truck other than are described in my Specification No. 373,355 aforesaid.

The invention is not limited to the precise details of construction hereinbefore described, since these may be modified without departing from the spirit and scope of the invention.

What I claim as my invention and desire to secure by Letters Patent is:—

1. A lifting-truck comprising two truck parts, lifting mechanism for moving one part relatively to the other to raise and lower the truck, a pawl operating between the two truck parts to retain the movable part in its position corresponding to the raised position of the truck, when desired, a controlling and withdrawal device for the pawl, yielding means for connecting said device to the pawl, and abutments on the truck to limit the movement of the controlling device in two positions in one only of which the relative positions of the controlling device and pawl are such that the controlling device, through the yielding means connecting it to the pawl, applies withdrawal force to the latter to tend to withdraw it from operative position the normal mode of bringing said controlling device into pawl-withdrawing position being manual and independent of the lifting mechanism of the truck, and the normal position occupied by said controlling device during travel of the truck both in its lowered and raised positions being that in which the controlling device is not applying withdrawal force to the pawl.

2. A lifting-truck comprising two truck parts, lifting mechanism for moving one part relatively to the other to raise and lower the truck, a pawl operating between the two truck parts to retain the movable part in its position corresponding to the raised position of the truck, when desired, a controlling and withdrawal lever for the pawl, a pivot for said lever, a spring for connecting said lever to the pawl, and abutments on the truck to limit the movement of the said lever in two angular positions about its pivot in one only of which the relative positions of the lever and pawl are such that the lever, through the spring connecting it to the pawl, applies withdrawal force to the latter to tend to withdraw it from operative position, the normal mode of bringing said lever into pawl-withdrawing position being manual and independent of the lifting mechanism of the truck, and the normal position occupied by said lever during travel of the truck both in its lowered and raised positions being that in which the lever is not applying withdrawal force to the pawl.

3. A lifting-truck comprising two truck parts, mechanism for moving one part relatively to the other to raise and lower the truck, a pawl operating between the two truck parts to retain the movable part in its position corresponding to the raised position of the truck, when desired, a controlling and withdrawal device for the pawl, yielding means for connecting said device to the pawl, abutments on the truck to limit the movement of the controlling device in two positions in one only of which the relative positions of the controlling device and pawl are such that the controlling device, through the yielding means connecting it to the pawl, applies withdrawal force to the latter to tend to withdraw it from operative position, and automatic means for moving the said controlling device from its pawl-withdrawing position towards its other position during the operation of lowering the truck.

4. A lifting-truck comprising two truck parts, mechanism for moving one part relatively to the other to raise and lower the truck, a pawl operating between the two truck parts to retain the movable part in its position corresponding to the raised position of the truck, when desired, a controlling and withdrawal device for the pawl, yielding means for connecting said device to the pawl, and abutments on the truck to limit the movement of the controlling device in two positions in one only of which the relative positions of the controlling device and pawl are such that the controlling device, through the yielding means connecting it to the pawl, applies withdrawal force to the latter to tend to withdraw it from operative position, said controlling device when in its pawl-withdrawing position projecting into the path of a part of the truck which moves during the lowering operation of the truck, whereby the said controlling device is automatically moved from its pawl-withdrawing position towards its other position by the said part of the truck during the operation of lowering the truck.

5. A lifting-truck comprising two truck parts, mechanism for moving one part relatively to the other to raise and lower the truck, a pawl operating between the two truck parts to retain the movable part in its position corresponding to the raised position of the truck, when desired, a controlling and withdrawal device for the pawl, supports for said device, a pivot for said pawl, a spring connecting said controlling device to the pawl, and abutments on the truck to limit the movement of the said controlling device in two positions in one only of which the relative positions of the pivot point of the pawl, the supports for the controlling device, and the points at which the pawl and controlling device are connected by the spring, are such that—(a) the spring tends to rotate the pawl in the disengaging direction, and (b) the spring tends to retain the controlling device in pawl-withdrawing position both before and after the pawl has been rotated into inoperative position.

6. A lifting-truck comprising two truck parts, mechanism for moving one part relatively to the other to raise and lower the truck, a pawl operating between the two truck parts to retain the movable part in its position corresponding to the raised position of the truck, when desired, a controlling and withdrawal device for the pawl, supports for said device, a pivot for said pawl, a spring connecting said controlling device to the pawl, abutments on the truck whereby the movement of the said controlling device is limited in two positions in one only of which the relative positions of the pivot point of the pawl, the supports for the controlling device and the points at which the pawl and controlling device are connected by the spring, are such that—(a) the spring tends to rotate the pawl in the disengaging direction, and (b) the spring tends to retain the controlling device in pawl-withdrawing position both before and after the pawl has been rotated into inoperative position, and automatic means for moving the said controlling device from its pawl-withdrawing position towards its other position during the operation of lowering the truck.

7. A lifting-truck comprising two truck parts, mechanism for moving one part relatively to the other to raise and lower the truck, a pawl operating between the two truck parts to retain the movable part in its position corresponding to the raised position of the truck, when desired, a controlling and withdrawal device for the pawl, supports for said device, a pivot for said pawl, a spring connecting said controlling device to the pawl, and abutments on the truck whereby the movement of the said controlling device is limited in two positions in one only of which the relative positions of the pivot point of the pawl, the supports for the controlling device and the points at which the pawl and controlling device are connected by the spring, are such that—(a) the spring tends to rotate the pawl in the disengaging direction, and (b) the spring tends to retain the controlling device in pawl-withdrawing position both before and after the pawl has been rotated into inoperative position, one of said abutments being cam-shaped and cooperating with the controlling device during the lowering operation of the truck to move the said device a sufficient distance out of its pawl-withdrawing position as to enable the spring of the controlling device to complete the return of the device to its other operative position.

In testimony whereof I affix my signature.

HAROLD EDWIN SPENCER.